United States Patent
O'Lenick, Jr. et al.

(10) Patent No.: US 6,610,751 B1
(45) Date of Patent: Aug. 26, 2003

(54) BIMODAL GUERBET ALKOXYLATES AS EMULSIFIERS

(76) Inventors: Anthony J. O'Lenick, Jr., 2170 Luke Edwards Rd., Dacula, GA (US) 30019; Michael Heath, 6817 Staffordshire St., Houston, TX (US) 77030; Bobby Viteaux, 1212 Elmgrove La., Keller, TX (US) 76248

( * ) Notice: Subject to any disclaimer, the term of this patent is extended or adjusted under 35 U.S.C. 154(b) by 99 days.

(21) Appl. No.: 10/010,516

(22) Filed: Dec. 10, 2001

(51) Int. Cl.[7] ............................. B01F 17/42; B01F 3/08; C07C 43/11
(52) U.S. Cl. ......................... 516/76; 516/30; 516/920; 568/625
(58) Field of Search ........................ 516/30, 76, 920; 514/941; 568/625

(56) References Cited

U.S. PATENT DOCUMENTS

| | | | | |
|---|---|---|---|---|
| 3,563,910 A | * | 2/1971 | Fishman | 516/76 X |
| 3,567,784 A | * | 3/1971 | Tsatsos et al. | |
| 4,171,455 A | * | 10/1979 | Tomita et al. | 516/76 X |
| 4,767,625 A | * | 8/1988 | Mitsuno et al. | 516/30 X |
| 4,830,769 A | | 5/1989 | O'Lenick, Jr. et al. | 568/622 X |
| 5,336,432 A | * | 8/1994 | Petchul et al. | 516/76 X |
| 6,140,297 A | * | 10/2000 | Ishii et al. | 568/625 X |
| 6,420,323 B2 | * | 7/2002 | Geke et al. | 516/30 X |

* cited by examiner

Primary Examiner—Richard D. Lovering

(57) ABSTRACT

The present invention relates to specific compositions made by alkoxylation of crude guerbet alcohol mixtures that contain between 15% and 50% lower molecular weight alkoxylated alcohols. The lower molecular weight alcohols are the raw material alcohols used to make the guerbet. Compositions containing this specific bi-modal distribution have unique emulsification properties.

18 Claims, No Drawings

BIMODAL GUERBET ALKOXYLATES AS EMULSIFIERS

FIELD OF INVENTION

The present invention relates to specific compositions made by alkoxylation of crude guerbet alcohol mixtures that contain between 15% and 50% lower molecular weight alkoxylated alcohols. The lower molecular weight alcohols are the raw material alcohols used to make the guerbet. Compositions containing this specific bi-modal distribution have unique emulsification properties.

BACKGROUND OF THE INVENTION

Guerbet alcohols have been known for over 100 years now. Marcel Guerbet pioneered the basic chemistry in the 1890s. It has allowed for the synthesis of a regiospecific beta branched hydrophobe which introduces high purity, branching into the molecule. Guerbet Alcohols, the oldest and best-understood material in the class of compounds, have been known since the 1890's when Marcel Guerbet [1] first synthesized these materials. The reaction sequence, which bears his name, is related to the Aldol Reaction and occurs at high temperatures under catalytic conditions.

The product is an alcohol with twice the molecular weight of the reactant alcohol minus a mole of water. The reaction proceeds by a number of sequential steps. These steps are (a) oxidation of alcohol to aldehyde, (b) Aldol condensation after proton extraction, (c) dehydration of the Aldol product, and (d) hydrogenation of the allylic aldehyde. The reaction takes place without catalyst, but it is strongly catalyzed by addition of hydrogen transfer catalysts. At low temperatures 130–140° C. the rate-limiting step is the oxidation process (i.e. formation of the aldehyde). At somewhat higher temperatures 160–180° C. the rate-limiting step is the Aldol Condensation. At even higher temperatures other degradative reactions occur and can become dominant.

Many catalysts have been described in the literature as effective for the preparation of Guerbet Alcohols. These include, nickel, lead salts (U.S. Pat. No. 3,119,880), Oxides of copper, lead, zinc, chromium, molybdenum, tungsten, and manganese (U.S. Pat. No. 3,558,716). Later US patents (U.S. Pat. No. 3,979,466) include palladium compounds and silver compounds (U.S. Pat. No. 3,864,407). There are advantages and disadvantages for each type.

The Cannizzaro Reaction is a major side reaction and is described as the disproportionation of two molecules of an aldehyde brought about by the action of sodium or potassium hydroxide to yield the corresponding alcohol and acid. On a practical level, it results in a product that is both difficult to purify and has undesired products present. The ability to capitalize upon the Guerbet reaction and develop useful cost effective derivatives has resulted eluded scientists for many years.

A major problem with the currently used Guerbet products is the fact that they are sold as very high purity products, requiring elaborate clean up processes and post treatments to make products that find applications mostly in cosmetic products. Guerbet alcohols undergo a series of post reaction steps that (a) remove unreacted alcohol (vacuum stripping), (b) remove unsaturation (hydrogenation), (c) remove Cannizzaro soap (filtration) and (d) remove color/odor bodies. These operations add to the cost of the product and make the utility impractical. All inventions covering Guerbet alcohols and their derivatives were made using highly purified materials, which not only limited the usefulness due to costs, but also as will become apparent by this disclosure, resulted in mono-modal surfactants that lack the highly efficient emulsification properties that result when using lower purity products. By lower purity products is meant those products in which unreacted raw material alcohol is left in the mixture and subsequently co-alkoxylated to give bi-modal surfactants, having unique emulsification properties.

Most commonly alcohols of natural origin, which are straight chain, even-carbon, primary alcohols are used for the production of Guerbet alcohols. Guerbet alcohols are beta branched primary alcohols. Oxo alcohols can also be used, but the reaction rate and conversions are reduced.

We have surprisingly found that upon alkoxylation of a low purity guerbet alcohol, a bi-modal alkoxylate occurs having outstanding emulsification properties. These emulsifiers are outstanding when used with crude petroleum and other non-polar compounds.

The Invention

Objective of the Current Invention

It is an objective of the present invention to provide unique bi-modal alkoxylated emulsifiers. These bi-modal emulsifiers are made up of between 50 and 90% by weight of a guerbet alcohol alkoxylate and between 10% and 50% by weight non-guerbet starting alcohol alkoxylate.

It is another objective of the present invention to provide a process for making emulsions using the unique bi-modal alkoxylated emulsifiers of the present invention.

SUMMARY OF THE INVENTION

The current invention is aimed at a bi-modal alkoxylated emulsifier made by the alkoxylation of a partially reacted crude guerbet alcohol. We have surprisingly found that when the guerbet reaction is carried out to between 50% and 75% many important, heretofore unrecognized benefits occur. The first is that the Cannizzaro reaction is almost nil, second the formation of higher molecular weight species likewise is almost nil, thirdly the reaction time is significantly reduced, yields are increased and most importantly when the resulting composition is alkoxylated with ethylene oxide, propylene oxide and mixtures thereof, unique very efficient bi-modal emulsifiers result.

DETAILED DESCRIPTION OF THE INVENTION

The current invention relates to a bi-modal emulsifier composition, which comprises:

(a) between 10% and 50% by weight of an emulsifier which conforms to the following structure:

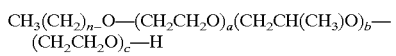

wherein;

n is an integer ranging from 5 to 19;

a, b, and c are independently each integers ranging from 0 to 20, with the proviso that a+b+c be greater than 5;

and (b) between 90% and 50% of an emulsifier which conforms to the following structure:

$$CH_3(CH_2)_yCHCH_2O-(CH_2CH_2O)_a(CH_2CH(CH_3)O)_b-(CH_2CH_2O)_c-H$$
$$|\quad (CH_2)_xCH_3$$

wherein;
y is an integer ranging from 5 to 19, and is equal to n;
x is an integer ranging from 3 to 17 with the proviso that x=y+2
a, b, and c are independently each integers ranging from 0 to 20, with the proviso that a+b+c be greater than 5.

Another aspect of the invention is drawn to a process for making an emulsion, which comprises mixing;

(1) between 1% and 50% by weight of a water insoluble oil,
(2) between 98% and 35% water
and
(3) between 1% and 15% by weight of bi-modal emulsifier compositions, which comprises:
   (a) between 10% and 50% by weight of an emulsifier which conforms to the following structure:

$$CH_3(CH_2)_n-O-(CH_2CH_2O)_a(CH_2CH(CH_3)O)_b-(CH_2CH_2O)_c-H$$

wherein;
n is an integer ranging from 5 to 19;
a, b, and c are independently each integers ranging from 0 to 20, with the proviso that a+b+c be greater than 5;
and
   (b) between 90% and 50% of an emulsifier which conforms to the following structure:

$$CH_3(CH_2)_yCHCH_2O-(CH_2CH_2O)_a(CH_2CH(CH_3)O)_b-(CH_2CH_2O)_c-H$$
$$|\quad (CH_2)_xCH_3$$

wherein;
y is an integer ranging from 5 to 19, and is equal to n;
x is an integer ranging from 3 to 17 with the proviso that x=y+2
a, b, and c are independently each integers ranging from 0 to 20, with the proviso that a+b+c be greater than 5.

The various proviso listed above are a direct result of the fact that the alcohol undergoing the Aldol condensation is the exact same alcohol that makes up the non-guerbet portion of the composition. Clearly, the non-guerbet alcohol has a much lower molecular weight than the guerbet alcohol (half the molecular weight+18). When this bi-modal mixture is alkoxylated as a mixture, the result is an emulsifier pair with outstanding emulsification properties due in part to the bi-modal composition.

Preferred Embodiments

In a preferred embodiment n is 5, x is 3 and y is 5.
In a preferred embodiment n is 9, x is 7 and y is 9.
In a preferred embodiment n is 7, x is 5 and y is 7.
In a preferred embodiment n is 11, x is 9 and y is 11.
In a preferred embodiment n is 19, x is 17 and y is 19.
In a preferred embodiment a+c ranges from 10–40.
In a preferred embodiment b ranges from 1 to 20.

In a preferred embodiment a+c ranges from 10–40 and b ranges from 1 to 20.

EXAMPLES OF BI-MODAL GUERBET ALCOHOLS

Example #1–5

To 967 grams of decyl alcohol in a suitable reaction flask, add 30.0 grams of sodium hydroxide and 2.0 grams of nickel, under good agitation. Heat material to between 230 and 250° C. The water generated from the reaction will be removed. Reaction progress is followed by GLC analysis. Samples were taken at different points in the reaction as shown below:

| Example | $CH_3(CH_2)_9CHCH_2OH$ with $(CH_2)_7CH_3$ branch | $CH_3(CH_2)_9OH$ |
|---|---|---|
| 1 | 50.0% | 50.0% |
| 2 | 60.2% | 39.8% |
| 3 | 74.6% | 24.4% |
| 4 | 85.0% | 15.0% |
| 5 | 90.0% | 10.0% |

Example #6–10

To 1000 grams of octyl alcohol in a suitable reaction flask, add 30.0 grams of potassium carbonate and 1.0 grams of nickel, under good agitation. Heat material to 220 to 240 C. The water generated from the reaction is distilled off. Reaction progress is followed by GLC analysis. Samples were taken at different points in the reaction as shown below:

| Example | $CH_3(CH_2)_7CHCH_2OH$ with $(CH_2)_5CH_3$ branch | $CH_3(CH_2)_7OH$ |
|---|---|---|
| 6 | 50.0% | 50.0% |
| 7 | 60.0% | 40.0% |
| 8 | 75.0% | 25.0% |
| 9 | 85.0% | 15.0% |
| 10 | 90.0% | 10.0% |

Example #11–15

To 1000 grams of lauryl alcohol in a suitable reaction flask, add 30.0 grams of potassium carbonate and 1.0 grams of nickel, under good agitation. Heat material to 220 to 240° C. The water generated from the reaction will be distilled off. Reaction progress is followed by GLC analysis. Samples were taken at different points in the reaction as shown below:

| Example | $CH_3(CH_2)_{11}CHCH_2OH$ with $(CH_2)_9CH_3$ branch | $CH_3(CH_2)_{11}OH$ |
|---|---|---|
| 11 | 50.0% | 50.0% |
| 12 | 60.0% | 40.0% |
| 13 | 75.0% | 25.0% |

-continued

| Example | (CH$_2$)$_9$CH$_3$<br>\|<br>CH$_3$(CH$_2$)$_{11}$CHCH$_2$OH | CH$_3$(CH$_2$)$_{11}$OH |
|---|---|---|
| 14 | 85.0% | 15.0% |
| 15 | 90.0% | 10.0% |

Example #16–20

To 1000 grams of C-20 alcohol in a suitable reaction flask, add 30.0 grams of potassium carbonate and 1.0 grams of nickel, under good agitation. Heat material to 220 to 240° C. The water generated from the reaction is distilled off. Reaction progress is followed by GLC analysis. Samples were taken at different points in the reaction as shown below:

| Example | (CH$_2$)$_{17}$CH$_3$<br>\|<br>CH$_3$(CH$_2$)$_{19}$CHCH$_2$OH | CH$_3$(CH$_2$)$_{19}$OH |
|---|---|---|
| 16 | 50.0% | 50.0% |
| 17 | 60.0% | 40.0% |
| 18 | 75.0% | 25.0% |
| 19 | 85.0% | 15.0% |
| 20 | 90.0% | 10.0% |

Example #21–25

To 1000 grams of hexyl alcohol in a suitable reaction flask, add 30.0 grams of potassium carbonate and 1.0 grams of nickel, under good agitation. Heat material to 220 to 240° C. The water generated from the reaction will be distilled off. Reaction progress is followed by GLC analysis. The product is a mixture of 2-butyl-octanol and hexyl alcohol. Samples were taken at different points in the reaction as shown below:

| Example | (CH$_2$)$_3$CH$_3$<br>\|<br>CH$_3$(CH$_2$)$_5$CHCH$_2$OH | CH$_3$(CH$_2$)$_5$OH |
|---|---|---|
| 21 | 50.0% | 50.0% |
| 22 | 60.0% | 40.0% |
| 23 | 75.0% | 25.0% |
| 24 | 85.0% | 15.0% |
| 25 | 90.0% | 10.0% |

EXAMPLES OF BI-MODAL GUERBET ALKOXYLATES

To the specified amount of the specified bi-modal guerbet is added 0.2% KOH based upon the total number of grams added (including ethylene oxide, propylene oxide and bimodal guerbet). The reaction is Apply nitrogen sparge through dump valve and charge Begin heating and allow to mix 15–20 minutes. Apply full vacuum and strip for 30–40 minutes at 220–240 F. Break vacuum with ethylene oxide and react at 290–300 F. and 45 psig. After all of the first ethylene oxide has been added, add propylene oxide. After the propylene oxide has been added add the last portion of ethylene oxide has been added. Hold at 290–300 F. for 1 hour.

| Example | Bimodal Example | Alcohol Grams | Ethylene Oxide (1) | Propylene Oxide | Ethylene Oxide (2) |
|---|---|---|---|---|---|
| 26 | 1 | 341 | 659 | 0 | 0 |
| 27 | 2 | 355 | 645 | 0 | 0 |
| 28 | 3 | 372 | 628 | 0 | 0 |
| 29 | 4 | 387 | 613 | 0 | 0 |
| 30 | 5 | 392 | 608 | 0 | 0 |
| 31 | 6 | 564 | 436 | 0 | 0 |
| 32 | 7 | 580 | 420 | 0 | 0 |
| 33 | 8 | 597 | 403 | 0 | 0 |
| 34 | 9 | 612 | 388 | 0 | 0 |
| 35 | 10 | 618 | 382 | 0 | 0 |
| 36 | 11 | 297 | 703 | 0 | 0 |
| 37 | 12 | 310 | 690 | 0 | 0 |
| 38 | 13 | 328 | 672 | 0 | 0 |
| 39 | 14 | 340 | 660 | 0 | 0 |
| 40 | 15 | 344 | 656 | 0 | 0 |
| 41 | 16 | 438 | 440 | 590 | 440 |
| 42 | 17 | 466 | 44 | 59 | 440 |
| 43 | 18 | 542 | 440 | 590 | 0 |
| 44 | 19 | 536 | 600 | 400 | 600 |
| 45 | 20 | 550 | 0 | 590 | 0 |
| 46 | 21 | 144 | 0 | 400 | 0 |
| 47 | 22 | 152 | 0 | 400 | 200 |
| 48 | 23 | 165 | 0 | 59 | 440 |
| 49 | 24 | 169 | 880 | 1180 | 880 |
| 50 | 25 | 176 | 880 | 0 | 880 |

APPLICATIONS EXAMPLES

The molecular weight of the alcohol for reaction purposes is calculated by 56110/Observed Hydroxyl Value= Calculated Molecular Weight

| Example | Observed Hydroxyl Value | Calculated MW |
|---|---|---|
| 1 | 246.0 | 228 |
| 2 | 231.6 | 242 |
| 3 | 215.1 | 261 |
| 4 | 202.6 | 277 |
| 5 | 197.5 | 284 |
| 6 | 301.6 | 186 |
| 7 | 284.5 | 197 |
| 8 | 262.2 | 214 |
| 9 | 247.2 | 227 |
| 10 | 243.1 | 231 |
| 11 | 207.3 | 270 |
| 12 | 195.6 | 287 |
| 13 | 179.5 | 312 |
| 14 | 170.6 | 329 |
| 15 | 166.4 | 337 |
| 16 | 128.0 | 438 |
| 17 | 120.1 | 466 |
| 18 | 389.6 | 542 |
| 19 | 368.2 | 536 |
| 20 | 102.0 | 550 |
| 21 | 389.6 | 144 |
| 22 | 368.2 | 152 |
| 23 | 340.0 | 165 |
| 24 | 331.6 | 169 |
| 25 | 315.6 | 177 |

HLB

HLB, the so-called Hydrophile—Lipophile Balance, is the ratio of oil soluble and water-soluble portions of a molecule. The system was originally developed for ethoxylated products. Listed in Table 1 are some approximations for the HLB value for surfactants as a function of their solubility in water. Values are assigned based upon that table to form a one-dimensional scale, ranging from 0 to 20.

The HLB system, in it's most basic form, allows for the calculation of HLB using the following formulation:

$$HLB = \frac{\% \text{ Hydrophile by weight of molecule}}{5}$$

One can predict the approximate HLB needed to emulsify a given material and make more intelligent estimates of which surfactant or combinations of surfactants are appropriate to a given application. When blends are used the HLB can be estimated by using a weighted average of the surfactants used in the blend.

HLB Needed to Emulsify

| Oil | HLB Needed |
|---|---|
| Cottonseed oil | 6 |
| Petrolatum | 7 |
| Chlorinated paraffin | 8 |
| Beeswax | 9 |
| Mineral spirits | 10 |
| Butyl Stearate | 11 |
| Lanolin | 12 |
| Orthodichlorobenzene | 13 |
| Nonylphenol | 14 |
| Benzene | 15 |
| Acid, Lauric | 16 |
| Acid, Oleic | 17 |

By using the oil specified and making an emulsion of it, one can calculate the emulsifier's HLB. The knowledge of what HLB is required to emulsify a particular oil allows one to experimentally determine the HLB of an unknown surfactant. Using this information above, a comparison of the calculated and observed HLB can be achieved. The bimodal emulsifier was blended with an oil of known Required HLB. The oils, or oil blends, were chosen based on their required HLB as compared to our calculated HLB values for the compounds. Initially, three emulsions of different HLB's were prepared at the calculated HLB value, one unit above, and one unit below. If the emulsions did not perform well, more emulsions were prepared until the emulsion performed well. Their performances were based on how milky and stable they were, relative to the other emulsions prepared in the series for that particular compound. The tested concentrations of water: oil: surfactant were 56%: 40%: 4%, respectively. Some of the oils we used include limonene, mineral spirits, paraffin oil, isopropyl myristate, isostearic acid, and oleic acid. The method is believed to be accurate to +/−1 HLB unit.

We have observed that by using bimodal guerbet emulsifiers of the present invention, not only are the values of the HLB shifted to the lower range, but the emulsion made using these kinds of emulsifiers are far more stable than with non-bimodal surfactants.

| Example | Calculated HLB | Observed HLB |
|---|---|---|
| 1 | 13.2 | 11.3 |
| 2 | 12.9 | 10.6 |
| 3 | 12.6 | 9.5 |
| 4 | 12.2 | 8.9 |
| 5 | 12.1 | 7.9 |
| 6 | 8.7 | 7.0 |
| 7 | 8.4 | 6.6 |
| 8 | 8.1 | 5.0 |

-continued

| Example | Calculated HLB | Observed HLB |
|---|---|---|
| 9 | 7.8 | 4.5 |
| 10 | 7.6 | 4.0 |
| 11 | 14.0 | 8.3 |
| 12 | 13.8 | 7.6 |
| 13 | 13.4 | 6.6 |
| 14 | 13.2 | 5.9 |
| 15 | 13.0 | 5.6 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

We claim:

1. A bi-modal emulsifier composition which comprises:
   (a) between 10% and 50% by weight of an emulsifier which conforms to the following structure:

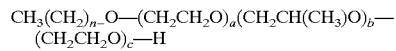

wherein;
   n is an integer ranging from 5 to 19;
   a, b, and c are independently each integers ranging from 0 to 20, with the proviso that a+b+c be greater than 5;
   and
   (b) between 90% and 50% of an emulsifier which conforms to the following structure:

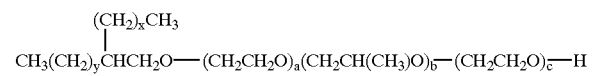

wherein;
   y is an integer ranging from 5 to 19, and is equal to n;
   x is an integer ranging from 3 to 17 with the proviso that x=y+2
   a, b, and c are independently each integers ranging from 0 to 20, with the proviso that a+b+c be greater than 5.

2. A bimodal composition of claim 1 wherein n is 5, x is 3 and y is 5.

3. A bimodal composition of claim 1 wherein n is 9, x is 7 and y is 9.

4. A bimodal composition of claim 1 wherein n is 7, x is 5 and y is 7.

5. A bimodal composition of claim 1 wherein n is 11, x is 9 and y is 11.

6. A bimodal composition of claim 1 wherein n is 19, x is 17 and y is 19.

7. A bimodal composition of claim 1 wherein a+c ranges from 10–40.

8. A bimodal composition of claim 1 wherein a+c ranges from 10–40.

9. A bimodal composition of claim 1 wherein a+c ranges from 10–40 and b ranges from 1 to 20.

10. A process for making an emulsion, which comprises mixing;

(4) between 1% and 50% by weight of a water insoluble oil,
(5) between 98% and 35% water
and
(6) between 1% and 15% by weight of bi-modal emulsifier compositions, which comprises:
  (a) between 10% and 50% by weight of an emulsifier which conforms to the following structure:

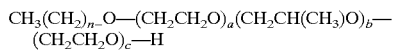
$$CH_3(CH_2)_n-O-(CH_2CH_2O)_a(CH_2CH(CH_3)O)_b-(CH_2CH_2O)_c-H$$

wherein;
  n is an integer ranging from 5 to 19;
  a, b, and c are independently each integers ranging from 0 to 20, with the proviso that a+b+c be greater than 5;
and
  (b) between 90% and 50% of an emulsifier which conforms to the following structure:

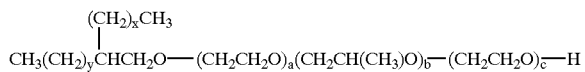
$$CH_3(CH_2)_y\overset{\displaystyle (CH_2)_xCH_3}{\underset{|}{C}}HCH_2O-(CH_2CH_2O)_a(CH_2CH(CH_3)O)_b-(CH_2CH_2O)_c-H$$

wherein;
y is an integer ranging from 5 to 19, and is equal to n;
x is an integer ranging from 3 to 17 with the proviso that x=y+2
a, b, and c are independently each integers ranging from 0 to 20, with the proviso that a+b+c be greater than 5.

11. A process of claim 10 wherein n is 5, x is 3 and y is 5.

12. A process of claim 10 wherein n is 9, x is 7 and y is 9.

13. A process of claim 10 wherein n is 7, x is 5 and y is 7.

14. A process of claim 10 wherein n is 11, x is 9 and y is 11.

15. A process of claim 10 wherein n is 19, x is 17 and y is 19.

16. A process of claim 10 wherein a+c ranges from 10–40.

17. A process of claim 10 wherein b ranges from 1 to 20.

18. A process of claim 10 wherein a+c ranges from 10–40 and b ranges from 1 to 20.

* * * * *